United States Patent [19]

Collison et al.

[11] Patent Number: 5,015,487

[45] Date of Patent: May 14, 1991

[54] USE OF LANTHIONINES FOR CONTROL OF POST-PROCESSING CONTAMINATION IN PROCESSED MEAT

[75] Inventors: Mark W. Collison, Granger; Terry F. Farver, Elkhart; Christine A. McDonald, Elkhart; Paula J. Herald, Elkhart; Daniel J. Monticello, Elkhart, all of Ind.

[73] Assignee: Haarmann & Reimer Corp., Springfield, N.J.

[21] Appl. No.: 513,252

[22] Filed: Apr. 23, 1990

[51] Int. Cl.$^5$ .......................... A23B 4/10; A23B 4/20
[52] U.S. Cl. ........................................ 426/332; 426/9; 426/133; 426/59; 426/335; 426/652; 426/654
[58] Field of Search .................. 426/332, 92, 335, 63, 426/56, 57, 59, 654, 652, 133, 135, 140, 9

[56] References Cited

U.S. PATENT DOCUMENTS 4,584,199 4/1986 Taylor .................................. 426/38
4,597,972 7/1986 Taylor .................................. 426/38

OTHER PUBLICATIONS

Somers, 1981, J. Food Science, 46:1972.
Scott, 1981, J. Food Science, 46:122.
Scott, 1981, J. Food Science, 46:117.
Chemical Abstracts, 1986, 104:128476t.
Chemical Abstracts, 1989, 111:38169k.
Chemical Abstracts, 1990, 112:95145u.
Chemical Abstracts, 1990, 113:96287z.
Delves-Broughton, 1990, Nisin and Its Uses as a Food Preservative, Nov. Issue, p. 100.

*Primary Examiner*—Carolyn Paden
*Attorney, Agent, or Firm*—Jerome L. Jeffers

[57] ABSTRACT

Disclosed is a method for inhibiting the contamination of processed meat products by pathogenic or spoilage microorganisms which method involves treating the surface of the meat product with a lanthionine bacteriocin.

10 Claims, No Drawings

USE OF LANTHIONINES FOR CONTROL OF POST-PROCESSING CONTAMINATION IN PROCESSED MEAT

BACKGROUND OF THE INVENTION

Chung et al., 1989 App. Env. Microbiol. 55: (6) 1329-1333 discuss the treatment of uncooked meats by soaking in a nisin solution and the effect of a nisin dip on raw meat inoculated previously with certain bacteria. They report a very short lifetime on nisin activity recovered from the raw meat (halflife of less than one day).

M Doyle in Food Technol. 1988 42: (4) 169-171, describes the inhibitory effects of nisin on the growth and survival of L. monocytogenes.

U.S. Pat. 4,597,972 discloses the mixing of food products with high levels of nisin to inhibit botulinum spore growth.

SUMMARY OF THE INVENTION

The present invention involves the application of a lanthionine bacteriocin to the surface of cooked meats in order to control post-processing contamination thereof.

DESCRIPTION OF THE INVENTION

The problem addressed by this invention is the surface contamination of heat-processed meats, e.g. frankfurters, deli-meats, cook-in-bag roast beef and shrimp with undesirable bacteria, in particular *Listeria monocytogenes*. It has been discovered that *L. monocytogenes* on the surface of heat processed meats such as frankfurters can be reduced or eliminated by applying a lanthionine bacteriocin such as nisin, subtilin, epidermin or Pep 5. to the surface thereof such as by dipping, spray coating or other surface application techniques. This surface application of such lanthionines results in a rapid reduction in *L. monocytogenes* cell numbers, and results in a continuation of such reduction for several weeks. Accordingly, it has been discovered that surface applications of nisin, subtilin, epidermin, Pep 5 or other lanthionine bacteriocin can be used after the heat treatment in the production of heat-processed meat products to control *L. monocytogenes* and other lanthionine bacteriocin sensitive food borne pathogens and spoilage organisms.

Referring back to the Chung article which describes the dip treatment of raw meat, one is led to the conclusion that nisin is of limited utility in the treatment of uncooked meat products and even that utility which is exhibited has a short lifetime. The present invention calls for the surface application of one or more lanthionine bacteriocins to a heat processed meat product after the heating step. It has been discovered that the treatment of processed meats, such as frankfurters, in this manner results in a significant reduction in the levels of contamination by *L. monocytogenes* within 30 minutes of such treatment and that the levels continue to decline for at least three weeks. This is in contrast to the published examples in which the effectiveness of nisin is of only a very short duration.

The method of practicing the present invention is further illustrated by the following examples in which the nisin units were determined by the method of Tramer and Fowler reported in J. Sci. Fd. Agric., 1964 Vol 15, 522-528.

EXAMPLE 1

Effect of Nisin on the Survival of *L. monocytogenes* on Frankfurters.

An overnight culture [1% inoculum, grown at 35° C. in BHI (brain heart infusion) medium from Difco] of *L. monocytogenes* Scott A was diluted 1:100 in 25 mM citrate buffer pH 6.0 (Buffer). A 1.5 ml portion of the diluted cells was transferred to 1.5 liters of Buffer in a sterile tub for inoculation of the frankfurters which were dipped for 15 seconds in the inoculum, drained a few seconds, and dipped in triplicate into treatment solutions containing nisin at the indicated concentrations in 50 ml Buffer pH 6. At each condition, 6 frankfurters (two series of three each) were treated. The three frankfurters from a single treatment were vacuum packed in a sterile stomacher bag and stored for 30 minutes at room temperature. Packages were opened and each frankfurter was transferred to an individual stomacher bag. There was added 205 ml Modified Listeria Enrichment Medium (UVM) from BBL to the bag and the frankfurters were stomached for 2 minutes.

The stomached material (10 ml) was transferred to each of 3 empty, sterile 20×150 mm tubes, 1 ml of this material was transferred to each of 3 tubes containing 9 ml UVM medium and to one tube containing 9 ml phosphate buffered saline (PBS) at pH 7.0. One ml of the 10 fold diluted material was transferred to each of 3 tubes containing 9 ml UVM medium and to one tube containing 9 ml PBS. One ml of the 100 fold diluted material was transferred to each of 3 tubes containing 9 ml UVM medium (i.e. a 3-tube most probable number procedure (MPN) was used with 10, 1, 0.1 and 0.01 ml stomached frankfurters in each set of tubes). The remainder of the sample was split into 4 volumes of about 70 ml each in sterile 25×200 mm tubes. All tubes were incubated at 35° C. for 24 hours to enrich any *L. monocytogenes*. To detect *L. monocytogenes*, a 0.1 ml portion from each UVM tube was transferred to a tube containing 9 ml Fraser's broth and incubated 48 hours at 35° C. Positive tubes were detected by darkening of the medium, and viable cell number per frankfurter were determined from a 3-place MPN table. The results of this procedure are shown in Table 1.

TABLE 1

Effect of Nisin on *Listeria monocytogenes* on Frankfurters Stored 30 Minutes

| Nisin Concentration (Units/ml) | Average Surviving Cell Number per Frank (by MPN Analysis) |
| --- | --- |
| 0 | 794 |
| 2000 | 130 |
| 4000 | 44 |
| 8000 | 25 |
| 16000 | 14 |
| 32000 | 4.7 |
| 64000 | 2.3 |

From the data of Table 1, it can be determined that a dip treatment with nisin followed by packaging and storage for 30 minutes of frankfurters inoculated with *L. monocytogenes* resulted in a decrease in the number of surviving cells and that this decrease is dependent on the concentration of nisin.

EXAMPLE 2

Effect of Nisin Against *L. monocytogenes* on Frankfurters Stored at 4° C. for 21 Days.

Frankfurters were treated as described above and the treated, vacuum packed franks stored for up to 21 days at 4° C. As shown in Table 2, the cell count of *L. monocytogenes* per frankfurter was greatly reduced and either continued to decrease (5,000 units/ml nisin) or remained extremely low (10,000 or 20,000 units/ml nisin) for at least 21 days.

TABLE 2

Effect of Nisin on *Listeria monocytogenes* on Frankfurters Stored up to 21 Days at 4° C.

| Storage Time (Days) at 4° C. | Concentration of Nisin (Units per ml) in Treatment Solution | | | |
|---|---|---|---|---|
| | 0 | 5000 | 10,000 | 20,000 |
| 0 | 1050 | (1050) | (1050) | (1050) |
| 9 | 1041 | 8 | 6 | 7 |
| 15 | >6000 | 4 | 1 | 1 |
| 21 | >600,000 | 2 | 1 | 1 |
| | Average Surviving Cell Number per Frank (By MPN Analysis) | | | |

Day 0 data for 5000, 10,000 and 20,000 units/ml nisin was not directly determined. The "(1050)" data reflects the avertage original inoculum level of all franks in the experiment.

These data are in direct contrast to published reports on raw meat where dipping it in a solution containing 10,000 units per ml nisin produced no additional reduction in cell number after its immediate effect and where the outgrowth of *L. monocytogenes* began within 2 weeks.

What is claimed is:

1. A method of controlling the contamination of processed meat products by undesirable microorganisms which method involves treating the surface of said meat product with a lanthionine bacteriocin after it has been heat treated.

2. The method of claim 1 wherein the processed meat product is selected from the group of frankfurters, delimeats, cook-in-bag roast beef and cooked shrimp.

3. The method of claim 1 wherein the processed meat is treated by dipping it into an solution of the lanthionine bacteriocin.

4. The method of claim 3 wherein the solution contains from 0.1 to 1,000,000 units per ml.

5. The method of claim 4, wherein the solution contains from 500 to 200,000 units per ml.

6. The method of claim 1 wherein the lanthionine bacteriocin is nisin, subtilin, epidermin or Pep 5.

7. The method of claim 1 wherein the lanthionine bacteriocin is nisin.

8. The method of claim 1, wherein the lanthionine bacteriocin is applied from its aqueous solution.

9. A method of treating frankfurters which comprises contacting the surface of the heat treated frankfurter with an aqueous solution of a lanthionine bacteriocin to thereby render the frankfurter resistant to contamination by *L. monocytogenes*.

10. The method of claim 9 wherein the lanthionine bacteriocin is nisin.

* * * * *